United States Patent

[11] 3,532,175

[72] Inventors Richard McFadyen
Essex Fells;
James M. Bosland, Wayne; Justin Marchese, Belleville, New Jersey
[21] Appl. No. 823,360
[22] Filed May 9, 1969
[45] Patented Oct. 6, 1970
[73] Assignee Ketcham and McDougall, Inc.
Roseland, New Jersey
a corporation of New Jersey

[54] SPRING-TYPE WEIGHER WITH PARALLELOGRAM LINKAGE
7 Claims, 3 Drawing Figs.
[52] U.S. Cl. .................................................. 177/169,
177/230, 177/231, 177/234
[51] Int. Cl. .................................................. G01g 23/14,
G01g 23/26, G01g 3/02

[50] Field of Search ........................................ 177/169,
170, 174, 225, 230, 231, 234

[56] References Cited
UNITED STATES PATENTS
967,188   8/1910   Hansen ..................   177/170
FOREIGN PATENTS
1,020,976   11/1952   France   ......................   177/231
715,326   9/1954   Great Britain ............   177/170
720,967   12/1954   Great Britain ............   177/231

*Primary Examiner*—Robert S. Ward, Jr.
*Attorney*—Darby and Darby

ABSTRACT: A simple, inexpensive, compact scale mechanism which can be fabricated largely from stamped sheet metal parts is disclosed. The scale mechanism employs a parallelogram linkage, sector gear and revolving drum indicator with a fixed pointer.

Patented Oct. 6, 1970

INVENTORS
RICHARD McFADYEN
JAMES M. BOSLAND
JUSTIN MARCHESE

BY Darby & Darby

ATTORNEYS

Patented Oct. 6, 1970

INVENTORS
RICHARD McFADYEN
JAMES M. BOSLAND
JUSTIN MARCHESE

BY Darby & Darby

ATTORNEYS

SPRING-TYPE WEIGHER WITH PARALLELOGRAM LINKAGE

This invention relates to scale mechanisms in general, and, more particularly, to a compact, inexpensive scale mechanism having a drum indicator and a fixed pointer.

Conventional scales of the type having revolving drum indicators are generally fairly large, heavy items having a relatively large number of parts including one or more expensive castings. Accordingly, there has been a need for a lightweight, compact inexpensive scale which might find use as a diet scale or a postage scale in a home or office where the amount of use and the space available would not justify the cost and size of a conventional scale of the type having a revolving drum indicator.

It is therefore an object of this invention to provide a simple inexpensive scale mechanism suitable for use at home or in a place of business.

It is another object of this invention to provide a scale mechanism having a revolving drum indicator.

It is also an object of this invention to provide a lightweight, compact scale mechanism which may be enclosed within an attractive shell or cover.

According to the above and other objects, the present invention provides a scale mechanism fabricated largely of stamped sheet metal parts. A parallelogram linkage is formed by a pair of stamped sheet metal pivot brackets pivotally mounted at one end to the upwardly extending sides of a stamped sheet metal support bracket, and are pivotally mounted at the other end to a vertical bracket which supports the weight platform. A vertically arranged tension spring connected to one of the pivot brackets provides that the motion of the parallelogram linkage is proportional to the weight applied to the platform. A sector gear extending from one of the pivot brackets engages a gear wheel on a drum-type indicator to provide an indication of the weight applied to the platform.

Other objects and advantages of the present invention will be apparent from the following detailed description and accompanying drawings which set forth the principle of the invention, and by way of example, the best mode contemplated of carrying out that principle.

Figure 1:
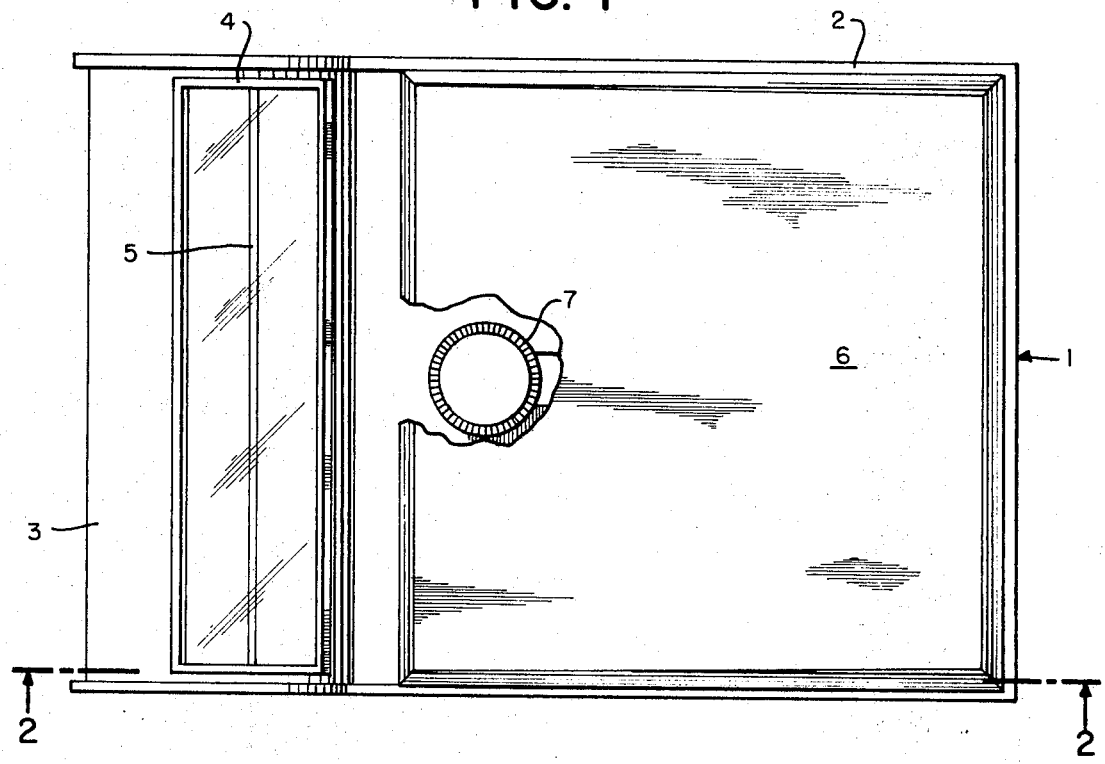
FIG. 1 is a plan view of the scale of the present invention with the weight platform cut away to show the zero adjustment knob.

Referring now to FIG. 1 of the drawings for a more detailed description of the scale mechanism of the present invention, there is shown a plan view of a scale generally designated 1. The scale 1 preferably has an attractive shell or cover which may be made of plastic and/or metal. In the preferred form of scale shown in FIGS. 1—3, the exterior shell or cover of the scale 1 consists of two parts designated 2 and 3. The part 2 comprises the bottom and side walls and rear wall of the exterior shell and is molded from a suitable plastic such as high impact styrene. The other part 3 comprises the top and sloping front of the exterior shell of scale 1 and is made of sheet metal. A window 4 is located in the sloping front surface of part 3. The window 4 may be made of glass or clear plastic and has an index line 5 marked on the surface thereof.

The weight platform 6, shown in FIG. 1 is partially broken away to show the knurled zero adjustment knob 7.

Figure 2:
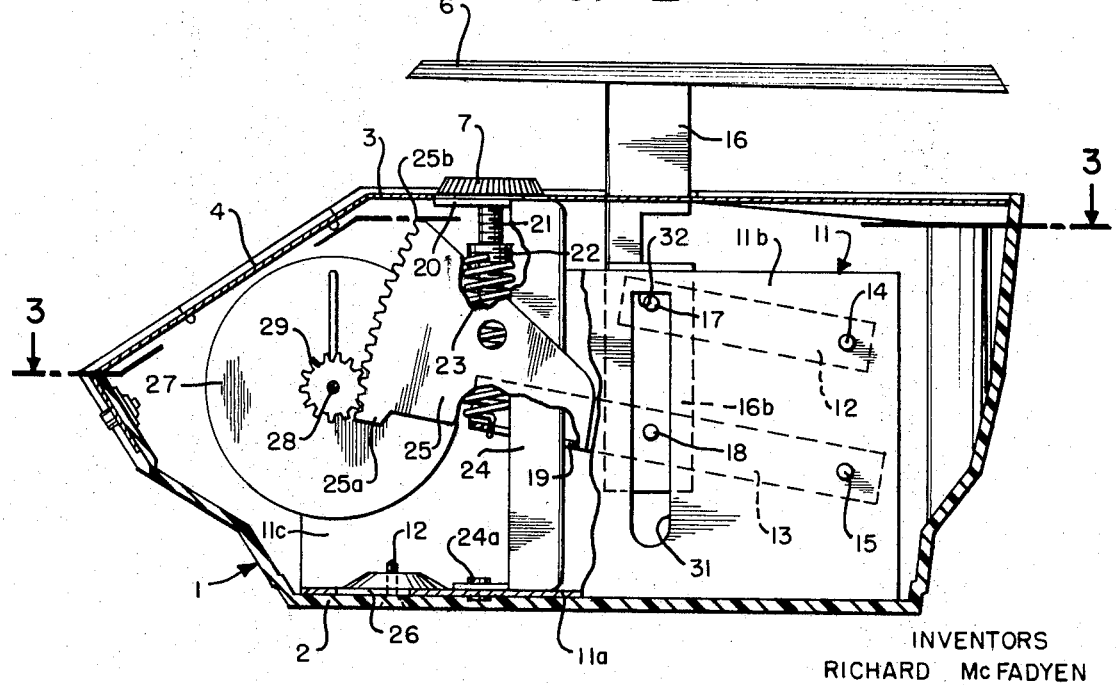
FIG. 2 is a cross section taken along the line 2–2 of FIG. 1 showing a side elevational view of the scale of the present invention.
Figure 3:
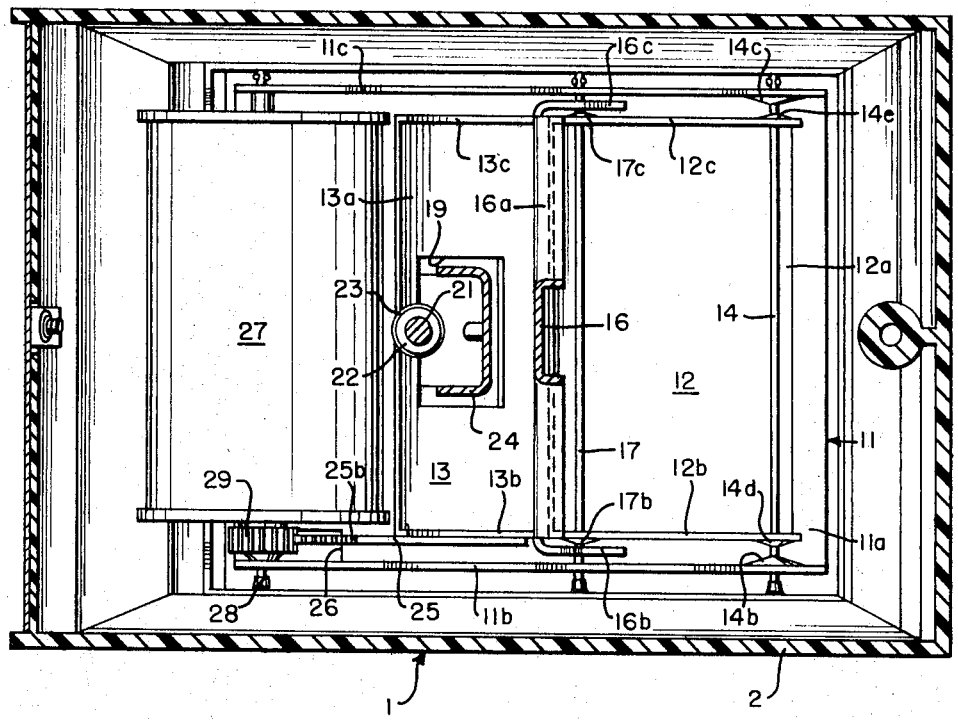
FIG. 3 is a cross sectional view taken along the line 3–3 of FIG. 2 showing further details of the scale mechanism of the present invention.

Referring now to FIG. 2 of the drawings, there is shown a side elevation view in cross section of the scale 1. Disposed within the exterior shell is the scale mechanism. A main support bracket 11 is secured to the bottom of part 2 of the exterior shell by means of one or more screws such as screw 12 shown in FIG. 2. The main support bracket or member 11 is preferably made of stamped sheet metal such as 0.04 in. thick zinc bonderized steel. The main support bracket 11 has a bottom portion 11a and two upwardly extending sides 11b and 11c.

Disposed between the upwardly extending sides 11b and 11c of main support bracket 11 are a pair of pivot brackets 12 and 13 which are also preferably made from stamped sheet metal, bracket 13 being longer and extending beyond bracket 12. As is more clearly shown in FIG. 3, the upper pivot bracket 12 has a central portion 12a and a pair of edge portions 12b and 12c and bent to extend at approximately right angles to the central portion 12a. Edge portions 12b and 12c of upper pivot bracket 12 are disposed adjacent the sides 11b and 11c of main support bracket 11.

Similarly, the lower pivot bracket 13 has a pair of edge portions 13b and 13c which are bent at approximately right angles to the central portion 13a of lower pivot bracket 13.

Upper pivot bracket 12 is pivotally mounted on main support bracket 11 by means of a shaft 14 which extends through suitable openings in edge portions 12b and 12c of pivot bracket 12 and through openings in the sides 11b and 11c of main support bracket 11. The shaft 14 may be simply hard tempered steel wire with ends easily deformed by an assembler to hold it in position when assembled.

The openings in the edge portions 12b and 12c of upper pivot bracket 12 are located in the center of outwardly extending bosses 14b and 14c. The openings in the sides 11b and 11c are located in the center of inwardly extending bosses 14d and 14e respectively. The bosses 14b and 14d and 14c and 14e cooperate to keep upper pivot bracket 12 roughly centered on shaft 14, thus preventing the edge portions 12b and 12c from scraping against the sides 11b and 11c.

The lower pivot bracket 13 is pivotally mounted on support bracket 11 by a shaft 15 which extends through suitable openings in the edge portions 13b and 13c of pivot bracket 13 and suitable openings in the sides 11b and 11c of support bracket 11. The openings in the edge portions 13b and 13c of lower pivot bracket 13 and in sides 11b and 11c of main support bracket 11 are located in the center of suitable bosses which serve to keep the lower pivot bracket 13 roughly centered on shaft 15 as described above in connection with upper pivot bracket 12 and shaft 14.

The weight platform 6 is mounted, by welding or rivets or the like, on a vertical platform supporting bracket 16 which is also preferably made of stamped sheet metal. The platform supporting bracket 16 has a central portion 16a and a pair of edge portions 16b and 16c which are bent at approximately right angles to central portion 16a. Platform supporting bracket 16 is pivotally connected to upper pivot bracket 12 by a shaft 17 which extends through suitable openings in the edge portions 12b and 12c of pivot bracket 12 and suitable openings in the edge portions 16b and 16c of platform support bracket 16. The openings in the edge portions 12b and 12c of upper pivot bracket 12 are located in the center of outwardly extending bosses 17b and 17c which serve to keep the parts properly positioned on shaft 17 and to prevent the edge portions 16b and 16c from scraping against the edge portions 12b and 12c.

Similarly, platform supporting bracket 16 is pivotally connected to lower support bracket 13 by a shaft 18. As thus connected, the platform supporting bracket 16, pivot brackets 12 and 13 and the sides 11b and 11c of support bracket 11 form a parallelogram linkage which serves to keep the platform supporting bracket 16 vertical, and the weight platform 6 horizontal as the platform 6 moves up and down in response to different weights applied thereto.

A spring supporting bracket 24 is riveted at 24a and extends upwardly from the bottom 11a of main support bracket 11 through an opening 19 in the central portion 13a of lower pivot bracket 13 to a position just beneath the top cover 4 of the scale 1. The knurled zero adjustment knob 7 is supported by the horizontally extending top portion 20 of spring support bracket 24. Extending downward from knurled knob 7 is a screw threaded shaft 21 upon which is threadedly mounted a nut 22. A coil tension spring 23 is fastened at its upper end to nut 22 and is connected at its lower end to the central portion 13a of lower pivot bracket 13. Hence, suitable rotation of knurled knob 7 will raise or lower nut 22 on threaded shaft 21 and thus raise or lower the position of lower pivot bracket 13 thus changing the zero position of the scale.

In the preferred form of the present invention, the coil spring 23 is fastened to nut 22 by virtue of the fact that the threads on the exterior of nut 22 have a greater pitch than the coils of spring 23. Also nut 22 has a greater diameter than spring 23.

Rigidly attached to the edge portion 13b of lower pivot bracket 13 is a sector gear 25 which is preferably made of stamped sheet metal and is mounted on lower pivot bracket 13 by means of welding or rivets or the like. The center of curvature of sector gear 25 coincides with the shaft 15 on which lower pivot bracket 13 is pivotally mounted on support bracket 11.

Weight indications are provided by an indicator drum 27 which is preferably molded from plastic such as, for example, high impact plastic. The drum 27 is rotatably mounted on the main support bracket 11 by a shaft 28 which extends through the axis of drum 27 and through suitable openings in the sides 11b and 11c of main support bracket 11. A gear wheel 29 is preferably molded as an integral part of drum 27. Gear wheel 29 engages sector gear 25 so that the drum 27 revolves in response to the motions of lower pivot bracket 13 which are in turn generally proportional to the weight applied to platform 6.

In the preferred form of the present invention, the downward motion of the parallelogram linkage is limited by the projecting end 25a of sector gear 25 which contacts the bottom part 2 of the exterior shell of the scale 1 through an opening 26 in main support bracket 11. The upward motion of the parallelogram linkage is limited by the upper end 25b of sector gear 25 which contacts the top cover 2 of the exterior shell of the scale 1. These limits to the motion of the parallelogram linkage prevent the sector gear from becoming disengaged from gear wheel 29 and the slight resiliency of bottom cover 2 and top cover 3 cushions shock resulting from the sector gear 25 travelling to the limit of its motion when a heavy weight is rapidly applied to or removed from the platform 6.

The scale markings on drum 27 are preferably applied in the form of a paper strip which is adhered to the drum 27 by a suitable adhesive. This arrangement facilitates the manufacture of a variety of scales having different scale markings. For example, in postage scales the indicator drum 27 may carry markings showing the postage on the item being weighed for each of a number of different classes of mail service such as, for example, air mail, first class, or bulk rate. On the other hand, in a diet scale, the drum 27 might carry markings in both grams and ounces. The drum type of indicator permits more information to be carried in legible fashion than does the circular type of scale format which is commonly used in conjunction with a pointer type indicator.

As shown in FIG. 2 of the drawings, the side portion 11b of main support bracket 11 is provided with a vertical slot or opening 31 to accommodate the motions of the ends of shafts 17 and 18. A corresponding slot or opening is provided in the side portion 11c of main support bracket 11. If desired, the upper end 32 of slot 31 may be made to serve as a limit to the upward travel of the end of shaft 17 so as to prevent the lower end of sector gear 25 from becoming disengaged from gear wheel 29 if a heavy object is quickly removed from the weight platform 6.

As shown in FIG. 2 the pivot brackets 12 and 13 are angled upward slightly from the horizontal when the scale is in its unloaded condition. It will further be appreciated that the pivot brackets 12 and 13 are angled slightly downward from the horizontal when the scale 1 is in its fully loaded condition. More particularly, the pivot brackets 12 and 13 are angled about 10° upward from the horizontal when the scale is in its unloaded condition, and are angled approximately 10° downward from the horizontal when the scale is fully loaded. This arrangement maximizes the linearity of the scale by minimizing errors due to the fact that the indicator drum 27 revolves in direct proportion to the angular motion of lower pivot bracket 13 while the angular motion of lower pivot bracket 13 is proportional to the weight applied to platform 6, times the cosine of the angle between the lower pivot bracket 13 and the horizontal.

It will be appreciated by those skilled in the art that certain modifications and adaptations of the above-described scale mechanism may be made without departing from the spirit and scope of the invention as set forth in the appended claims. For example, other types of spring mechanisms such as a compression spring or a cantilever-type spring might be used to provide the restoring force to the parallelogram linkage. Further, it will be apparent that the sector gear 25 might be mounted on upper pivot bracket 12 rather than lower pivot bracket 13 or might constitute a rack mounted on platform supporting bracket 16.

It will further be apparent that the main support bracket 11, the pivot brackets 12 and 13 and the platform supporting bracket 16 are preferably made of sheet metal; these parts might alternatively be moulded of plastic.

We Claim:

1. A scale mechanism comprising:
   a main support member made of sheet material and having a bottom portion and a pair of upwardly extending side portions;
   a pair of pivot brackets, each of said pivot brackets being made of sheet material and having a central portion and a pair of edge portions extending at right angles to said central portion, said pivot brackets being disposed between the upwardly extending side portions of said main support member with said edge portions of said pivot brackets adjacent said upwardly extending side portion of said main support member;
   a first pair of shafts for pivotally mounting said pair of pivot brackets on said main support member, each of said shafts extending through both edge portions of its associated pivot bracket and through both upwardly extending side portions of said main support member, said edge portions of said pivot brackets and said upwardly extending side portions of said main support member having openings to receive said shafts;
   a horizontal platform for supporting articles to be weighed;
   a platform supporting bracket extending downward from said platform, said platform supporting bracket being made of sheet material and having a central portion and a pair of edge portions extending at right angles to said central portion;
   a second pair of shafts for connecting said platform support bracket to said pair of pivot brackets, each of said shafts extending through the edge portions of its associated pivot bracket and through the edge portions of said platform supporting bracket, said edge portions of said pivot brackets and said edge portions of said platform supporting bracket having openings to receive said shafts;
   spring means connected to one of said brackets to resiliently urge said bracket upward and to allow said bracket to move downward in proportion to the weight applied to said platform;
   a sector gear extending from the end of one of said brackets, the center of curvature of said sector gear coinciding with said shaft for pivotally mounting said one of said brackets on said main support member;
   an indicator drum disposed between the upwardly extending sides of said main support member; and
   a shaft for mounting said indicator drum on said main support member, said shaft extending through said indicator drum along the axis thereof and through said upwardly extending sides of said main support member, said main support member having openings to receive said shaft, said indicator drum having a gear wheel for engaging said sector gear so that said indicator drum will revolve in proportion to the weight applied to said platform.

2. The scale mechanism of claim 1 wherein each of said openings for receiving said first pair of shafts in said main support member is located in the center of an inwardly extending boss, and each of said openings for receiving said first pair of shafts in said pivot brackets is located in the center of an outwardly extending boss, said bosses cooperating to maintain said pivot brackets spaced apart from said upwardly extending sides of said main support member.

3. The scale mechanism of claim 1 further comprising a top cover and a bottom cover mounted on said main support member, the upper end of said sector gear contacting said top cover at the upper limit of the motion of said sector gear and the lower end of said sector gear contacting said bottom cover at the lower limit of the motion of said sector gear in order to prevent said sector gear from becoming disengaged from said gear wheel on said indicator drum.

4. The scale mechanism of claim 1 wherein said spring means comprises an adjustment knob rotatably mounted on said main supporting member, a screw shaft projecting from said adjustment knob, a nut threadedly engaging said screw shaft, said nut being threaded on its exterior surface, and a coil spring, one end of said coil spring engaging one of said brackets and the other end of said coil spring threadedly engaging the exterior surface of said nut, the exterior diameter of said nut being greater than the interior diameter of said coil spring when relaxed.

5. The scale mechanism of claim 4 wherein the pitch of the threads on the exterior surface of said nut is greater than the pitch of the coils of said coil spring.

6. The scale mechanism of claim 1 wherein said pivot brackets are angled upward from the horizontal when said platform is unloaded and are angled downward a substantially equal angle from the horizontal when said platform is fully loaded.

7. The scale mechanism of claim 1 wherein a pair of elongated vertical openings are provided in said upwardly extending sides of said main support member to accommodate the ends of said second pair of shafts, the upper ends of said openings serving as maximum limit stops the upward motion of the ends of the uppermost of said second pair of shafts to prevent the end of said sector gear from becoming disengaged from said gear wheel on said indicator drum.